United States Patent [19] [11] 3,713,939
Preg [45] Jan. 30, 1973

[54] METHOD OF PROCESSING ARTICLES OF VERY THIN PLASTIC FILM MATERIAL

[75] Inventor: Robert Preg, Reading, Pa.

[73] Assignee: The Polymer Corporation, Reading, Pa.

[22] Filed: March 4, 1970

[21] Appl. No.: 16,380

[52] U.S. Cl. .................156/248, 156/267, 156/268, 156/270
[51] Int. Cl. ........................B32b 31/08, B32b 31/18
[58] Field of Search........156/248, 268, 267, 270, 247

[56] References Cited

UNITED STATES PATENTS

| | | | |
|---|---|---|---|
| 3,497,410 | 2/1970 | Zagusta et al. | 156/267 X |
| 3,028,576 | 4/1962 | Gerard | 156/268 X |
| 3,531,350 | 9/1970 | Rausing et al. | 156/268 X |
| 3,574,026 | 4/1971 | Kucheck | 156/248 X |
| 3,535,182 | 10/1970 | Meier-Maletz | 156/268 X |
| 3,032,463 | 5/1962 | Morgan | 156/268 X |
| 2,307,909 | 1/1943 | Avery | 156/248 X |
| 3,020,186 | 2/1962 | Lawrence | 156/248 |
| 3,457,137 | 7/1969 | McCarthy | 156/248 X |

Primary Examiner—Carl D. Quarforth
Assistant Examiner—Roger S. Gaither
Attorney—Synnestvedt & Lechner

[57] ABSTRACT

A technique for handling very thin plastic film which, due to a thickness of from 0.002 to 0.015 inches, is extremely flexible, and otherwise extremely difficult to handle. The plastic nature of the material further makes it subject to the tribo electric phenomena resulting in a tendency to adhere to other objects. These adversities are eliminated by laminating an extended web of relatively stiff, pressure sensitive, adhesive backing material to the thin film prior to stamping components of relatively small size therefrom. In the stamping operation the backing material is not cut through. Thus, the cut pieces of thin film remain affixed to the extended web of backing material until they arrive at the point of end use. The relatively low peel strength of the pressure-sensitive backing material facilitates the ready removal of the cut pieces of thin film at the point of end use while at the same time ensuring that the thin film and backing material do not become disassociated during the various phases of the processing operation.

4 Claims, 2 Drawing Figures

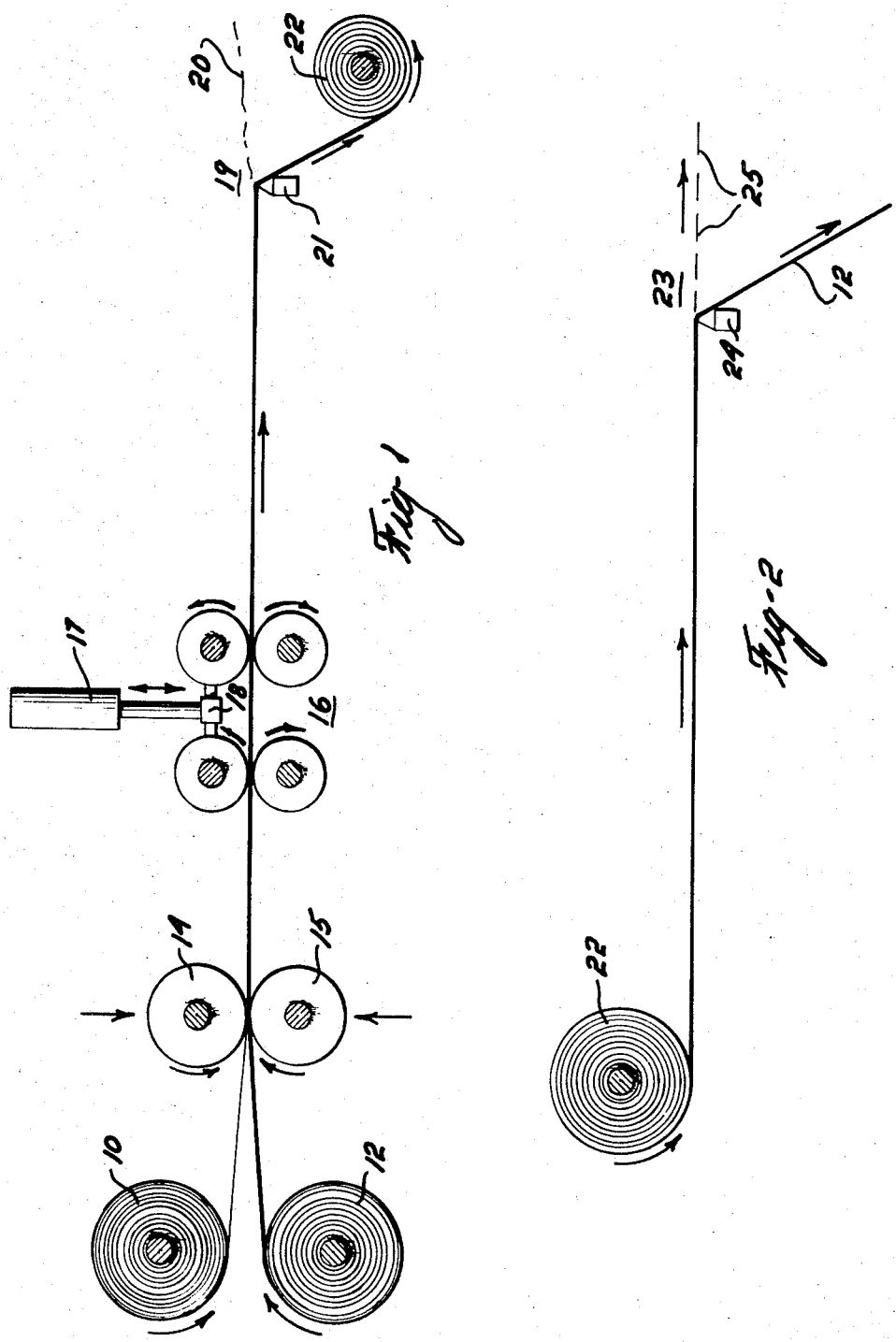

METHOD OF PROCESSING ARTICLES OF VERY THIN PLASTIC FILM MATERIAL

The undesirable aspects of the phenomena of tribo electricity (often referred to as static electricity) have long been recognized and have been attributed to electric charge accumulations. This phenomena depends on an excess of charge of one sign existing, on a macroscopic basis, in one or more locations with respect to charge groups of the opposite sign. Conditions of this nature are established when two dissimilar substances are rubbed together.

Since modern plastics are excellent insulators and at the same time easily electrified by frictional effects, even in ordinary handling, it is not unreasonable to expect them to be particularly susceptible to the tribo electric phenomena. This is in fact the case, and particularly so for thin sheets or films which are difficult to handle owing to their tendency to adhere to one another and to other surfaces.

Optimum operating conditions have been devised to somewhat alleviate problems resulting from the tribo electric phenomena as related to the handling of thin sheets or films. However, such approaches are generally ineffective for dealing with relatively small sections of plastic sheet or film material.

It is accordingly a principal object of the present invention to devise a new and unique way of handling thin sheets of plastic material and the preparation of small items therefrom so as to eliminate problems resulting from the tribo electric phenomena.

In addition to problems relating to the tribo electric phenomena, the difficulties of working with thin plastic films are compounded by the extreme flexibility of the material, thus often making automatic production operations impossible.

Accordingly, it is another principal object of the present invention to facilitate automatic production operations with thin plastic films despite the extremely flexible nature of the material.

The principles of the present invention find particular application in stamping operations involving the stamping of parts from thin film material having a thickness on the order of 0.002 to 0.015 inches. Material of this nature is so thin and flexible that it is difficult to see and handle. The tribo electric phenomena mentioned above is particularly pronounced with materials of these dimensions with the result that the material sticks to the die of the stamping machine. This in turn results in a drastic reduction in machine production rates to the point where production can no longer be competitively maintained.

It is another more specific object of the present invention to devise a new and unique way of producing stamped parts from thin plastic film and at the same time eliminate production problems related to static electricity and the extremely flexible nature of the thin film being used.

In the preferred embodiment of the present invention these goals are achieved by first laminating a pressure-sensitive adhesive-backed material to the thin film. The adhesive-backed material must be of sufficient thickness to add the desired stiffness to the film to facilitate handling in standard fabricating equipment. Parts are then produced from the backed film by stamping through the film but not the backing material. The excess, or scrap, film is then stripped from the backing material leaving thereon a series of finished pieces.

For commercial production purposes the thin film and backing material are of indeterminate length. Thus, the finished pieces on the backing material stripped of excess plastic film may be conveniently coiled or cut to length and stacked. The finished pieces, being mounted on the backing material, are thus cushioned for shipment. Not only does the backing material facilitate handling during the fabrication stage, but also permits the automatic feeding of the finished parts at the point of ultimate use.

Other more specific features and advantages accruing to the use of the present invention will become apparent from the detailed description of the drawings which follow.

In the drawing:

FIG. 1 depicts the steps involved in the practice of the present invention during the fabrication stage; and FIG. 2 depicts the steps relating to the end use of the product resulting from the practice of the present invention.

Referring now to FIG. 1 of the drawings, therein is shown an arrangement for fabricating articles of thin plastic sheet material on the order of from 0.002 to 0.015 inches. This arrangement is capable of producing stamped objects in commercial quantities and at competitive production rates. The fabricator is not faced with undue difficulties in handling the thin film because of its flexibility or because of a tendency of the material to stick to itself or to the die punch.

Included in FIG. 1 are a pair of coiled members 10 and 12. Coil 10 carries an indeterminate length of thin plastic film which may be teflon, nylon, mylar or any of the other thin plastic films currently available. Member 12 is a coil of adhesive backing material which may comprise a paper or plastic base covered with a pressure-sensitive adhesive. In the preferred embodiment of the present invention, a pressure-sensitive tape is used having the characteristics of a tacky-surfaced felt.

The film and backing material from the coils 10 and 12 are fed to a laminating station comprising rolls 14. The rolls 14 and 15 are positioned to ensure that the proper degree of adhesion between the thin film and adhesive-backed material is developed. The rolls 14 and 15 are adjustable to accommodate various thicknesses of plastic film and backing material and are also of sufficient width to accommodate a variety of product widths.

From the laminating station the sandwiched structure of thin film and backing material is advanced to a fabricating station 16. The fabricating station may comprise a conventional reciprocating or rotary press 17 wherein a die 18 shaped to any desired configuration may be used to stamp out the thin plastic sheet material without completely cutting through the backing material. Were both the plastic film and backing material cut through, the combination would tend to disassociate itself from the rest of the web. Such disassociation is avoided by stamping with the die from the thin plastic film side of the lamination. This further ensures that the finished piece will be readily removable from the backing material at the point of use.

After the stamping operation has been completed, the laminated material proceeds to a scrap stripping station 19 where excess portions 20 of the thin plastic material are stripped off and discarded leaving the finished pieces laminated to the backing material. The stripping step is performed by drawing the laminated combination of thin film and backing material down over a 90° bend having a maximum corner radius on the order of one-sixteenth inch. In FIG. 1 this function is depicted as being performed by member 21.

The finished pieces laminated to the backing material are coiled for shipment to point of use or for temporary storage until time of use. As an alternative to the coiled configuration, a shearing member may be introduced after the scrap stripping step to cut the laminated material into desired lengths for shipment or storage.

Turning now to FIG. 2, therein is shown a coil containing the finished, thin plastic, pieces laminated to the adhesive backing material this corresponds to member 22 of FIG. 1. The coil 22 in FIG. 2 is shown in position for automatic feeding to the point of end use. The point of end use is indicated generally as number 23. It is at the point of end use that the finished pieces 25 are separated from the backing material by a pick-off stripping tool similar in nature to that utilized at the scrap stripping station 19 of FIG. 1. In this respect the laminated combination is passed over the sharp edge of member 24 in such manner that the finished pieces 25 are raised from the backing material 12 so as to be conveniently removed by manual or automatic means.

To facilitate the stripping of the finished pieces from the backing material at the point of end use, it is important that the adhesive portion of the backing material provide a low peel strength. The low peel strength must obtain notwithstanding the fact that the laminated structure will be subjected to several tons of force during various phases of the operation and yet there must be sufficient adhesive strength between the thin plastic and backing material to successfully carry it through the punch press operation. The backing material must be relatively inexpensive inasmuch as it is entirely discarded.

Another important characteristic of the backing material used in the preferred embodiment of the present invention concerns its relatively compressible nature. This enables it to serve effectively as a back-up member during the initial stages of the stamping operation when the thin plastic film material is being penetrated by the die and yet the positive thickness and compactability of the backing material ensures that the stamp will be arrested before entirely penetrating the backing material.

In the practice of the preferred embodiment of the present invention, Minnesota Mining and Manufacturing Company's type 341 tape was laminated to teflon having the dimensions 0.0025 inches by 2.250 inches and a length of approximately 150 feet. From the laminated structure disc-shaped washers were stamped. These were designed to be used as bearing surfaces in magnetic tape cassettes. The discs as stamped were approximately 1½ inches in diameter, having a center hole of approximately ¼ inch.

Alternative techniques for cutting or forming the finished pieces will suggest themselves to persons of ordinary skill. For example, the backing material, rather than corresponding identically in width and length to the thin film being processed, may take the form of reinforcing strips. Alternatively, the backing material may comprise a grid configuration of flexible or semi-rigid material. Accordingly, it should be apparent that the principles of the present invention extend beyond the practice of the preferred embodiment as are clearly brought out in the claims which follow.

I claim:

1. A method of handling a very thin film of plastic material which material has a propensity to adhere through static electricity to other objects, including objects of similar and dissimilar nature but no other adhesive properties, comprising the steps of providing a thin film of said material of indeterminate length, providing a backing material at least one side of which is provided with an adhesive surface, feeding said thin film and backing material to a laminating station whereat the thin film is laminated to the adhesive surface of said backing material so as to securely hold the thin film to the backing material during the subsequent working operations, including the ultimate transfer thereof to the point of end use, continuously passing the resulting laminate through a work station whereat the thin film is subjected to a cutting operation wherein a cutter cuts through the thin film and into but not through the backing material, thus continuously forming articles of desired configuration, passing said laminate to a first stripping station whereat excess portions of the thin film are stripped from the backing material, leaving said articles of desired configuration on said backing material, transferring said articles of desired configuration on said backing material to a second stripping station whereat said articles of desired configuration are stripped from said backing material without any adhesive material adhering to said articles, thus making sequentially available a continuous supply of said articles of desired configuration at the point of end use.

2. The method of claim 1 wherein the thin film is of teflon having a thickness of less than 0.015 inches.

3. The method of claim 1 wherein the cutting performed on the thin film at the work station is effected by a conventional die punch technique.

4. The method of claim 1 wherein the backing material laminated to the thin film is a pressure-sensitive tape having relatively compressible characteristics which enable said thin film to be completely cut through in the cutting operation by a die without cutting through the backing material.

* * * * *